US008699629B2

(12) United States Patent
Zhang

(10) Patent No.: US 8,699,629 B2
(45) Date of Patent: Apr. 15, 2014

(54) SIGNAL DEMODULATION METHOD

(75) Inventor: Yun Zhang, Shanghai (CN)

(73) Assignee: Omnivision Technologies (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 13/595,749

(22) Filed: Aug. 27, 2012

(65) Prior Publication Data

US 2013/0058441 A1    Mar. 7, 2013

(30) Foreign Application Priority Data

Sep. 7, 2011  (CN) .......................... 2011 1 0264491

(51) Int. Cl.
  *H03D 3/22*    (2006.01)
  *H04L 27/22*   (2006.01)

(52) U.S. Cl.
  USPC ......................................... 375/331; 375/324

(58) Field of Classification Search
  USPC .................... 375/316, 324, 329, 331, 332
  See application file for complete search history.

(56) References Cited

U.S. PATENT DOCUMENTS

| | | | |
|---|---|---|---|
| 7,298,798 B1* | 11/2007 | Chao et al. ..................... | 375/341 |
| 8,130,814 B2* | 3/2012 | Sivaswamy et al. ........... | 375/140 |
| 2003/0147478 A1* | 8/2003 | Chang et al. ................... | 375/340 |
| 2004/0086062 A1* | 5/2004 | Eckhardt et al. ............... | 375/343 |
| 2004/0091031 A1* | 5/2004 | Dodgson et al. ............... | 375/222 |

* cited by examiner

*Primary Examiner* — Chieh M Fan
*Assistant Examiner* — Freshteh N Aghdam
(74) *Attorney, Agent, or Firm* — Blakely Sokoloff Taylor & Zafman

(57) ABSTRACT

A signal demodulation method is disclosed, which includes: obtaining a complete transmission code word; calculating estimated values of three non-differential phases of the transmission code based on a majority logic; identifying a most unreliable phase among three non-differential phases and determining the other two reliable phases to obtain their determination values; calculating determination values of the rest two phases based on the two determined phases; and looking up in tables based on determination values of the four phases to obtain incoming bits. The demodulation method of the present invention is capable of sufficiently reducing the effect of noise on signal and effectively improving the signal demodulation performance.

7 Claims, 3 Drawing Sheets

SIGNAL DEMODULATION METHOD

CROSS-REFERENCE TO RELATED APPLICATIONS

This application claims the priority of Chinese patent application number 201110264491.7, filed on Sep. 7, 2011, the entire contents of which are incorporated herein by reference.

TECHNICAL FIELD

The present invention relates to the field of signal processing, and more particular, to a signal demodulation method.

BACKGROUND

IEEE 802.11b protocol has adopted CCK (Complementary Code Keying) modulation for 11 Mbps data rates. CCK is defined by a set of 256 code words, and each of the code words consists of 8 complex chips. Such code word set is quasi-orthogonal. If common phases between code words are not taken into consideration, the set of 256 code words is actually a set of 64 code words referred to as basic CCK code word set.

In CCK modulation, an incoming bit stream is divided into groups of 8 bits, denoted by $(d_0, d_1, d_2, d_3, d_4, d_5, d_6, d_7)$. In each group of the 8 incoming bits, the first two bits $(d_0, d_1)$ are encoded using DQPSK modulation (as shown in Table 1) to obtain a phase $\phi_0$, and the rest six bits are pairwise encoded using QPSK modulation (as shown in Table 2), namely $(d_2, d_3)$, $(d_4, d_5)$ and $(d_6, d_7)$ are encoded using QPSK modulation to obtain phases $\phi_1$, $\phi_2$ and $\phi_3$, respectively. Among these four phases, $\phi_0$ is a differential phase and the rest three are non-differential phases.

$$c_0 = +\exp(j*(\phi_0+\phi_1+\phi_2+\phi_3))$$
$$c_1 = +\exp(j*(\phi_0+\phi_2+\phi_3))$$
$$c_2 = +\exp(j*(\phi_0+\phi_1+\phi_3))$$
$$c_3 = -\exp(j*(\phi_0+\phi_3))$$
$$c_4 = +\exp(j*(\phi_0+\phi_1+\phi_2))$$
$$c_5 = +\exp(j*(\phi_0+\phi_2))$$
$$c_6 = -\exp(j*(\phi_0+\phi_1))$$
$$c_7 = +\exp(j*(\phi_0)) \quad (1)$$

Finally, the outputted code word $C=(c_0, c_1, c_2, c_3, c_4, c_5, c_6, c_7)$ is given by equation (1). Each chip of the code word C after CCK modulation is transmitted in sequence, and the received code word is denoted as $R=(r_0, r_1, r_2, r_3, r_4, r_5, r_6, r_7)$.

TABLE 1

| DQPSK Coding | | | | |
|---|---|---|---|---|
| $(d_0, d_1)$ | (0, 0) | (0, 1) | (1, 1) | (1, 0) |
| Even Symbol $\phi_0$ | 0 | $\pi/2$ | $\pi$ | $3\pi/2$ |
| Odd Symbol $\phi_0$ | $\pi$ | $3\pi/2$ | 0 | $\pi/2$ |

TABLE 2

| QPSK Coding | | | | |
|---|---|---|---|---|
| $(d_{2j}, d_{2j+1})$ | (0, 0) | (0, 1) | (1, 1) | (1,0) |
| $\phi_j$ | 0 | $\pi/2$ | $3\pi/2$ | $\pi$ |

A complete transmission frame (PPDU) structure for IEEE 802.11b is shown in FIG. 1, wherein the preamble at 1 Mbps is modulated using DBPSK modulation for spread spectrum transmission; the following frame header part may be at 1 Mbps or 2 Mbps, and are modulated using DBPSK and DQPSK modulation for spread spectrum transmission; the data part are directly modulated using CCK modulation for transmission. When a receiver is receiving the preamble, these known information can be used to synchronize the carrier frequency and phase. CCK demodulation is applied once the synchronization is locked.

Correlation matching method is usually used by CCK transmission for signal demodulation. The correlation matching usually employs FWT (Fast Wavelet Transform) algorithm to reduce calculation amount, but still consumes great resource and processing time. In addition, it is also proposed in the prior art a principle of majority logic decoding, which is enable to directly demodulate the three non-differential phases by simple multiplication, addition and phase determination operations. The algorithms of majority logic decoding are expressed by equations (2) and (3):

$$\exp(j*\tilde{\varphi}_1) = \frac{r_0*r_1^- - r_2*r_3^- + r_4*r_5^- - r_6*r_7^-}{4} \quad (2)$$
$$\exp(j*\tilde{\varphi}_2) = \frac{r_0*r_2^- - r_1*r_3^- - r_4*r_6^- + r_5*r_7^-}{4}$$
$$\exp(j*\tilde{\varphi}_3) = \frac{r_0*r_4^- + r_1*r_5^- - r_2*r_6^- - r_3*r_7^-}{4}$$

$$\exp(j*\tilde{\varphi}_0) = r_0*\exp(-j*(\varphi_1+\varphi_2+\varphi_3)) + r_1*\exp(-j*(\varphi_2+\varphi_3)) + \quad (3)$$
$$r_2*\exp(-j*(\hat{\varphi}_1+\hat{\varphi}_3)) - r_3*\exp(-j*\hat{\varphi}_3) +$$
$$r_4*\exp(-j*(\hat{\varphi}_1+\hat{\varphi}_2)) + r_5*\exp(-j*\hat{\varphi}_2) - r_6*\exp(-j*\hat{\varphi}_1) + r_7$$

In the above equations (2) and (3), $\hat{\phi}_i$ (i=0,1,2,3) is the determination value of $\tilde{\phi}_i$ (i=0,1,2,3), and has a value set of $(0,\pi/2,\pi,3\pi/2)$, And the determination rule is to find a value from the set $(0,\pi/2,\pi,3\pi/2)$ that is closest to the phase $\tilde{\phi}_i$ (i=0,1,2,3).

Although the majority logic decoding method has advantages of simple algorithm, less resource requirement and high processing speed, CCK transmission employing this method has poor demodulation performance.

Thus, it is necessary to design a high performance demodulation method with simple algorithm and less resource requirement to overcome the shortcomings of the prior art.

SUMMARY OF THE INVENTION

An objective of the present invention is to provide a signal demodulation method that is capable of sufficiently reducing the effect of noise on signal and effectively improving the signal demodulation performance.

To achieve the above objective, the signal demodulation method provided by the present invention includes the following steps:

step 1: obtain a complete transmission code word;
step 2: calculate estimated values of three non-differential phases of the transmission code word based on the majority logic;

step 3: identify the most unreliable phase among the three non-differential phases and determine the other two reliable phases to obtain their determination values;

step 4: calculating determination values of the rest two phases based on the two phases determined in step 3;

step 5: look up in tables to obtain incoming bits based on the determination values of the four phases.

Further, the code word obtained in step 1 can be a CCK code word, a quasi-orthogonally modulated code word or a block code code word.

Preferably, the code word is a complete CCK code word with 8 code chips denoted by $R=(r_0, r_1, r_2, r_3, r_4, r_5, r_6, r_7)$.

Further, in step 2, estimated values of the three non-differential phases are calculated using the formulae:

$$\exp(j*\tilde{\varphi}_1) = \frac{r_0*r_1^- - r_2*r_3^- + r_4*r_5^- - r_6*r_7^-}{4}$$

$$\exp(j*\tilde{\varphi}_2) = \frac{r_0*r_2^- - r_1*r_3^- - r_4*r_6^- + r_5*r_7^-}{4}$$

$$\exp(j*\tilde{\varphi}_3) = \frac{r_0*r_4^- + r_1*r_5^- - r_2*r_6^- - r_3*r_7^-}{4}$$

where, $\tilde{\phi}_i$ (i=0, 1, 2, 3) is an actual received value.

Further, in step 3, the determination value of $\tilde{\phi}_i$ (i=0, 1, 2, 3) is denoted as $\hat{\phi}_i$ (i=1, 2, 3) has a value set $(0, \pi/2, \pi, 3\pi/2)$; the value $\hat{\phi}_i$ (i=1, 2, 3) is determined by finding a value from the set $(0, \pi/2, \pi, 3\pi/2)$ that is closest to the phase $\tilde{\phi}_i$ (i=0, 1, 2, 3).

Further, in step 3, an ideal transmission code word has a value set of $(1, j, -1, -j)$; the most unreliable phase is the phase corresponding to the complex number having its real part closest to its imaginary part in absolute value among complex numbers $\exp(j*\tilde{\varphi}_1)$, $\exp(j*\tilde{\varphi}_2)$, $\exp(j*\tilde{\varphi}_3)$.

Preferably, in step 5, the incoming 8 bits are obtained by looking up in tables based on the determined phases.

By using the above technical solution, the present invention is capable of sufficiently reducing the effect of noise on signal and effectively improving the signal demodulation performance.

DETAILED DESCRIPTION

The present invention proposes a strategy of multi-stage demodulation, whose principle is as follows: 1) determine one or more new phases at each time and substitute all the determined phases into an original formula; combine repeatedly appearing parts of the received signal so as to sufficiently reduce the effect of noise; 2) determine the rest one or more phases; 3) continuously repeat the above two steps until all the phases are successfully demodulated. With this strategy, the demodulation performance can be greatly improved by: a) demodulate and determine the most reliable phases based on equation (2) first; b) substitute the determined phases into equation (1), so that the number of unknown variables in formula (1) are reduced; then combine repeatedly appearing parts of the received signal based on equation (1); c) demodulate and determine the most reliable phases among the rest phases; d) repeat steps a) to c) until all the phases are demodulated.

In particular, the present invention proposed a two-stage demodulation method for CCK signals, which includes: first, calculate actual received values of three non-differential phases by obtaining chip values of a transmitted code word; then identify a most unreliable phase among the three non-differential phases and determine the other two reliable phases; calculate determination values of the rest two phases based on the two determined phases; finally, look up in tables to obtain incoming bits based on the determination values of the four phases. By this way, the present invention is capable of sufficiently reducing the effect of noise on signal and effectively improving the signal demodulation performance.

In order to make objectives, technical solutions and advantages of the present invention more apparent, the present invention will be further described and specified below in combination with accompanying drawings and embodiments.

Figure 1:
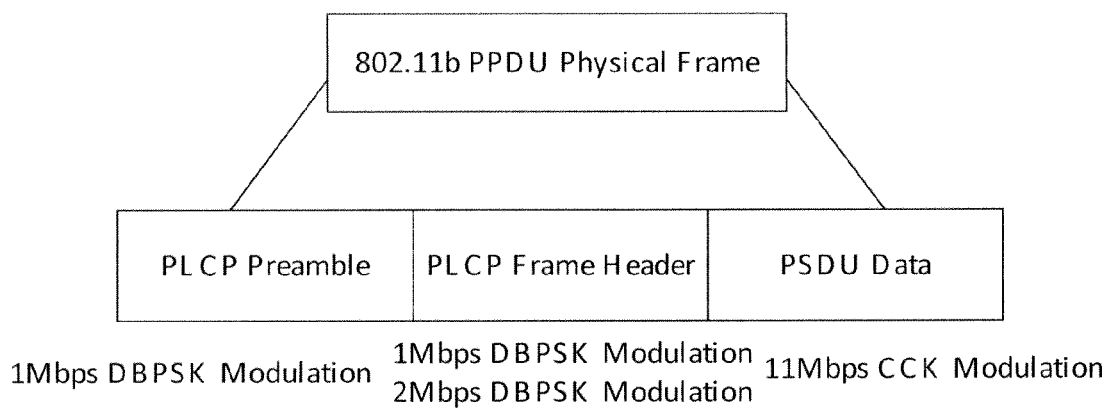
FIG. 1 is a schematic diagram illustrating the structure of a complete IEEE 802.11b transmission frame.
Figure 2:
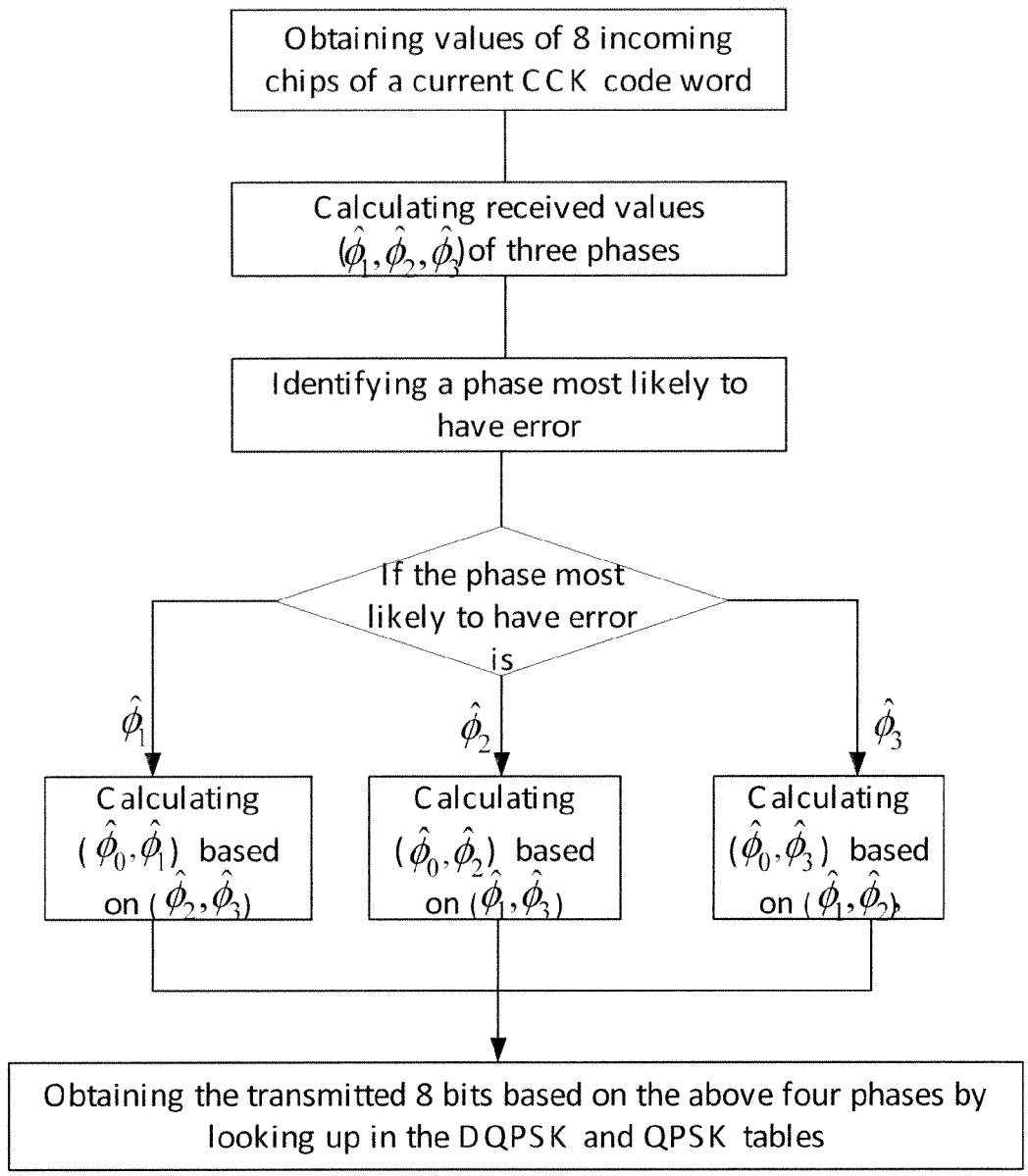
FIG. 2 is a flow chart of an embodiment of the present invention.

FIG. 2 is a flow chart of an embodiment of the present invention, which includes the following steps:

step 1: obtain a complete transmission code word;

In particular, in this embodiment, step 1 is to obtain the values of 8 incoming chips of the current code word. The code word can be a CCK code word, a quasi-orthogonally modulated code word or a block code code word, but is not limited thereto. In CCK modulation, an incoming bit stream is divided into groups of 8 bits, denoted by $(d_0, d_1, d_2, d_3, d_4, d_5, d_6, d_7)$. In each group of the 8 incoming bits, the first two bits $(d_0, d_1)$ are encoded using DQPSK modulation (as shown in Table 1) to obtain a phase $\phi_0$, and the rest six bits are pairwise encoded using QPSK modulation (as shown in Table 2), namely $(d_2, d_3)$, $(d_4, d_5)$ and $(d_6, d_7)$ are encoded using QPSK modulation to obtain phases $\phi_1$, $\phi_2$ and $\phi_3$, respectively. Finally, the code word outputted is denoted as $C=(c_0, c_1, c_2, c_3, c_4, c_5, c_6, c_7)$ which is expressed by equation (1):

$c_0 = +\exp(j*(\phi_0+\phi_1+\phi_2+\phi_3))$ $c_1 = +\exp(j*(\phi_0+\phi_2+\phi_3))$ $c_2 = +\exp(j*(\phi_0+\phi_1+\phi_3))$ $c_3 = -\exp(j*(\phi_0+\phi_3))$ (1)

$c_4 = +\exp(j*(\phi_0+\phi_1+\phi_2))$ $c_5 = +\exp(j*(\phi_0+\phi_2))$ $c_6 = -\exp(j*(\phi_0+\phi_1))$ $c_7 = +\exp(j*(\phi_0))$ (1)

TABLE 1

| DQPSK Coding | | | | |
|---|---|---|---|---|
| $(d_0, d_1)$ | (0, 0) | (0, 1) | (1, 1) | (1, 0) |
| Even Symbol $\phi_0$ | 0 | $\pi/2$ | $\pi$ | $3\pi/2$ |
| Odd Symbol $\phi_0$ | $\pi$ | $3\pi/2$ | 0 | $\pi/2$ |

TABLE 2

| QPSK Coding | | | | |
|---|---|---|---|---|
| $(d_{2j}, d_{2j+1})$ | (0, 0) | (0, 1) | (1, 1) | (1, 0) |
| $\phi_j$ | 0 | $\pi/2$ | $3\pi/2$ | $\pi$ |

Each chip of the code word C after CCK modulation is transmitted in sequence, and the received code word is denoted as $R=(r_0, r_1, r_2, r_3, r_4, r_5, r_6, r_7)$.

Step 2: calculate estimated values of three non-differential phases of the transmission code word based on a majority logic;

In particular, in this embodiment, the majority logic is employed in CCK code word demodulation to calculate actual received values of three non-differential phases. The demodulation process is expressed by equation (2):

$$\exp(j*\tilde{\varphi}_1) = \frac{r_0*r_1^- - r_2*r_3^- + r_4*r_5^- - r_6*r_7^-}{4}$$

$$\exp(j*\tilde{\varphi}_2) = \frac{r_0*r_2^- - r_1*r_3^- - r_4*r_6^- + r_5*r_7^-}{4} \quad (2)$$

$$\exp(j*\tilde{\varphi}_3) = \frac{r_0*r_4^- + r_1*r_5^- - r_2*r_6^- - r_3*r_7^-}{4}$$

where, $\tilde{\phi}_i$ (i=0, 1, 2, 3) indicates an actual received value.

Step 3: identify a most unreliable phase among the three non-differential phases and determine the other two reliable phases to obtain their determination values;

The determination value of is denoted as $\tilde{\phi}_i$ (i=0, 1, 2, 3) is denoted as $\hat{\phi}_i$ (i=1, 2, 3) and has a value set of (0, π/2, π, 3π/2). And the determination rule is to find a value from the set (0, π/2, π, 3π/2) that is closest to the phase $\tilde{\phi}_i$ (i=0, 1, 2, 3).

In this embodiment, it is apparent how the most unreliable phase among the three phases $\hat{\phi}_1$, $\hat{\phi}_2$, $\hat{\phi}_3$ shall be identified. Since an ideal transmission code word has a value set of (1, j, −1, −j), the most unreliable phase, namely the one most likely to have error, shall be the phase corresponding to the complex number having its real part closest to its imaginary part in absolute value among complex numbers $\exp(j*\tilde{\varphi}_1)$, $\exp(j*\tilde{\varphi}_2)$, $\exp(j*\tilde{\varphi}_3)$. The real part and imaginary part of each complex number are defined as $real_i$ and $imag_i$, respectively, where i=1,2,3, namely $$\exp(j*\tilde{\varphi}_1) = real_1 + j*imag_1$$

$$\exp(j*\tilde{\varphi}_2) = real_2 + j*imag_2$$

$$\exp(j*\tilde{\varphi}_3) = real_3 + j*imag_3$$

On this basis, the greater one between absolute values $|real_i|$ and $|imag_i|$ can be defined as $max_i$ and the smaller one can be defined as $min_i$, i.e., $$max_i = \max(|real_i|, |imag_i|)$$

$$min_i = \min(|real_i|, |imag_i|).$$

It can be easily found that the most unreliable phase has the smallest value of $max_i/min_i$, and the smallest value can be determined by three times of comparisons between $max_i/min_i$ and $max_j/min_j$, where i=1, 2, 3, j=1, 2, 3 and i≠j. In fact, the comparison between $max_i/min_i$ and $max_j/min_j$ can be otherwise carried out by comparing $max_i*min_j$ with $max_j*min_i$.

Step 4: calculate determination values of the rest two phases based on the two phases determined in step 3;

In particular, in this embodiment, the transmission code word is denoted by $C=(c_0, c_1, c_2, c_3, c_4, c_5, c_6, c_7)$ and its value set is (1, j, −1, −j). The received code word containing noise is denoted as $R=(r_0, r_1, r_2, r_3, r_4, r_5, r_6, r_7)$.

There are three cases:

Case 1: if the most unreliable phase is $\hat{\phi}_1$, then $\hat{\phi}_1$ and $\hat{\phi}_0$ can be determined by equation (4):

$$\exp(j*\widetilde{\varphi_0}) = r_1*\exp(-j*(\hat{\phi}_2+\hat{\phi}_3)) - r_3*\exp(-j*\hat{\phi}_3) + r_5*\exp(-j*\hat{\phi}_2) + r_7$$

$$\exp(j*\widetilde{\varphi_{01}}) = r_0*\exp(-j*(\hat{\phi}_2+\hat{\phi}_3)) + r_2*\exp(-j*\hat{\phi}_3) + r_4*\exp(-j*\hat{\phi}_2) - r_6$$

$$\exp(j*\widetilde{\varphi_1}) = \exp(j*\widetilde{\varphi_{01}})*\exp(-j*\hat{\phi}_0) \quad (4)$$

Case 2: if the most unreliable phase is $\hat{\phi}_2$, then $\hat{\phi}_2$ and $\hat{\phi}_0$ can be determined by equation (5):

$$\exp(j*\widetilde{\varphi_0}) = r_2*\exp(-j*(\hat{\phi}_1+\hat{\phi}_3)) - r_3*\exp(-j*\hat{\phi}_3) + r_6*\exp(-j*\hat{\phi}_1) + r_7$$

$$\exp(j*\widetilde{\varphi_{02}}) = r_0*\exp(-j*(\hat{\phi}_1+\hat{\phi}_3)) + r_1*\exp(-j*\hat{\phi}_3) + r_4*\exp(-j*\hat{\phi}_1) - r_5$$

$$\exp(j*\widetilde{\varphi_2}) = \exp(j*\widetilde{\varphi_{02}})*\exp(-j*\hat{\phi}_0) \quad (5)$$

Case 3: if the most unreliable phase is $\hat{\phi}_3$, then $\hat{\phi}_3$ and $\hat{\phi}_0$ can be determined by equation (6):

$$\exp(j*\widetilde{\varphi_0}) = r_4*\exp(-j*(\hat{\phi}_1+\hat{\phi}_2)) + r_5*\exp(-j*\hat{\phi}_2) - r_6*\exp(-j*\hat{\phi}_1) + r_7$$

$$\exp(j*\widetilde{\varphi_{03}}) = r_0*\exp(-j*(\hat{\phi}_1+\hat{\phi}_2)) + r_1*\exp(-j*\hat{\phi}_2) + r_2*\exp(-j*\hat{\phi}_1) - r_3$$

$$\exp(j*\widetilde{\varphi_3}) = \exp(j*\widetilde{\varphi_{03}})*\exp(-j*\hat{\phi}_0) \quad (6)$$

Step 5: look up in tables (Table 1 and Table 2) to obtain incoming bits based on the determination values of the four phases.

In particular, in this embodiment, corresponding 8 bits can be obtained by looking up in Table 1 (DQPSK Coding) and Table 2 (QPSK Coding) based on the obtained determination values $\hat{\phi}_i$ (i=0,1,2,3).

TABLE 1

| DQPSK Coding | | | | |
|---|---|---|---|---|
| $(d_0, d_1)$ | (0, 0) | (0, 1) | (1, 1) | (1, 0) |
| Even Symbol $\phi_0$ | 0 | π/2 | π | 3π/2 |
| Odd Symbol $\phi_0$ | π | 3π/2 | 0 | π/2 |

TABLE 2

| QPSK Coding | | | | |
|---|---|---|---|---|
| $(d_{2j}, d_{2j+1})$ | (0, 0) | (0, 1) | (1, 1) | (1, 0) |
| $\phi_j$ | 0 | π/2 | 3π/2 | π |

An example will be provided below to illustrate an application of the present invention. In fact, correctness of CCK demodulation results depends on whether the determination values of the four phases $\hat{\phi}_0$, $\hat{\phi}_1$, $\hat{\phi}_2$, $\hat{\phi}_3$ are correct. For convenience of description, the method of calculating $\hat{\phi}_0$, $\hat{\phi}_1$, $\hat{\phi}_2$, $\hat{\phi}_3$ will be directly illustrated herein. After $\hat{\phi}_0$, $\hat{\phi}_1$, $\hat{\phi}_2$, $\hat{\phi}_3$ are determined, the corresponding 8 bits can be obtained by looking up in DQPSK and QPSK tables in a reverse way.

Step 1: if four transmission phases are $\phi_0=\pi/2$, $\phi_1=\pi/2$, $\phi_2=\pi/2$, $\phi_3=\pi/2$, the transmission code word can be obtained as by using equation C=(−j, 1, j, 1, −1, −j, −1, j) by using equation (1).

Since the code word C is affected by additive white Gaussian noise during the transmission process, the actual received code word $R=(r_0, r_1, r_2, r_3, r_4, r_5, r_6, r_7)$ will be:

$r_0=0.2991-0.6964j$ $r_1=0.761-0.4412j$ $r_2=-0.0148+1.0131j$ $r_3=0.5396-0.1047j$ $r_4=-1.2804-0.1357j$ $r_5=-0.9670-0.5708j$ $r_6=-0.7094-0.5962j$ $r_7=0.0850+1.1435j$.

Step 2: calculate complex numbers $\exp(j*\tilde{\varphi}_1)$, $\exp(j*\tilde{\varphi}_2)$, $\exp(j*\tilde{\varphi}_3)$, by using formula (2):

$\exp(j*\tilde{\varphi}_1)=2.7083-2.3075j$ $\exp(j*\tilde{\varphi}_2)=-2.3942+1.5894j$ $\exp(j*\tilde{\varphi}_3)=-0.1111+3.1502j$.

Step 3: identify the most unreliable phase based on the following comparison results:

$\max_1=2.7083, \min_1 2.3075\ \max_1*\min_2=4.3046,$
$\min_1*\max_2=6.6784$ $\max_2=2.8942, \min_2 1.5894\ \max_1*\min_3=0.3009,$
$\min_1*\max_3=7.2691$ $\max_3=3.1502, \min_3 0.1111, \max_2*\min_3=0.3215,$
$\min_2*\max_3=5.0069.$ The smallest value $\max_1*\min_3$ indicates that $\hat{\phi}_1$ is most greatly affected by noise during the transmission process, so that $\hat{\phi}_1$ is the most unreliable phase. Meanwhile, $\phi_2$ and $\phi_3$ are determined in this step to obtain $\hat{\phi}_2$, $\hat{\phi}_3$.

Step 4: determine $\hat{\phi}_0$ and $\hat{\phi}_1$ by using equation (4) to get $\exp(j*\tilde{\varphi}_0)=1.5979+3.0210j$ $\exp(j*\tilde{\varphi}_{01})=3.6993+1.0458j$ based on the obtained $\hat{\phi}_2$ and $\hat{\phi}_3$. Now, determination values of the four transmission phases $\hat{\phi}_0, \hat{\phi}_1, \hat{\phi}_2, \hat{\phi}_3$ are all correctly demodulated.

Figure 3:
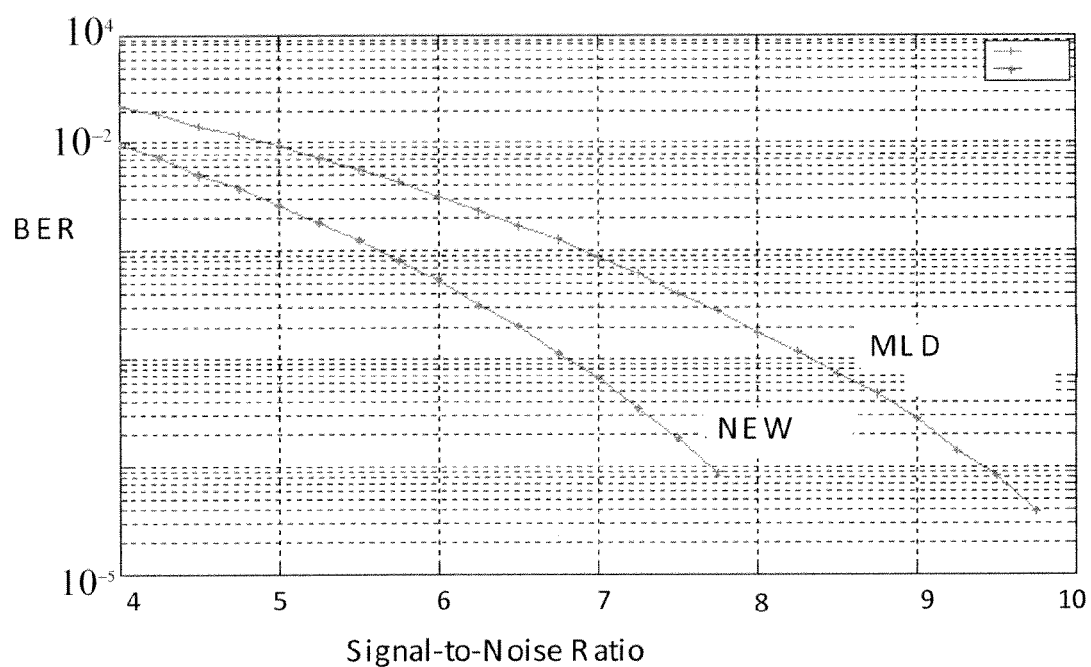
FIG. 3 is a schematic diagram comparing the BER (Bit Error Rate) performances of the present invention and the majority logic decoding method.

Step 5: look up in DQPSK and QPSK tables in a reverse way to obtain corresponding 8 transmission bits based on the determined $\hat{\phi}_0, \hat{\phi}_1, \hat{\phi}_2, \hat{\phi}_3$. It can be found from the above results that the embodiment of the present invention is capable of maximizing the recovery of original information from a received signal seriously affected by noise, and is applicable in demodulation for quasi-orthogonal modulation and block code or the like. With the above improvement, the present invention can significantly improve the demodulation threshold for CCK transmission, and the BER performance could have an increase of 1.8 dB compared with the prior art as shown in FIG. 3, wherein the MLD curve indicates the BER performance based on the majority logic decoding method, while the NEW curve indicates the BER performance improved by the present invention. Moreover, if multi-stage demodulation is used, the present invention can achieve a greater performance improvement and have remarkable technical effects.

Numerous embodiments with great variations can be made without departing from the spirit and scope of the invention. It will be understood that specific embodiments described in the specification shall not be intended to limit the scope of the invention which shall solely be limited by the appended claims.

What is claimed is:

1. A signal demodulation method, comprising:
   step 1: obtaining a complete transmission code word which is derived from three non-differential phases and one differential phase;
   step 2: calculating estimated values of the three non-differential phases of the transmission code word based on a majority logic;
   step 3: identifying a most unreliable phase among the three non-differential phases and determining the other two reliable phases among the three non-differential phases to obtain their determination values;
   step 4: calculating determination values of the most unreliable phase and the one differential phase based on the two reliable phases determined in step 3;
   step 5: looking up in tables to obtain incoming bits based on the determination values of the three non-differential phases and the one differential phase.

2. The signal demodulation method according to claim 1, wherein the code word obtained in step 1 can be a CCK code word, a quasi-orthogonally modulated code word or a block code code word.

3. The signal demodulation method according to claim 1, wherein the code word is a complete CCK code word with 8 chips denoted as $R=(r_0, r_1, r_2, r_3, r_4, r_5, r_6, r_7)$.

4. The signal demodulation method according to claim 3, wherein, in step 2, the estimated values of the three non-differential phases are calculated using the formulae:

$$\exp(j*\tilde{\varphi}_1) = \frac{r_0*r_1 - r_2*r_3 + r_4*r_5 - r_6*r_7}{4}$$

$$\exp(j*\tilde{\varphi}_2) = \frac{r_0*\bar{r_2} - r_1*\bar{r_3} - r_4*\bar{r_6} + r_5*\bar{r_7}}{4}$$

$$\exp(j*\tilde{\varphi}_3) = \frac{r_0*\bar{r_4} + r_1*\bar{r_5} - r_2*\bar{r_6} - r_3*\bar{r_7}}{4}$$

where, $\tilde{\phi}_i$ (i=0, 1, 2, 3) is an actual received value.

5. The signal demodulation method according to claim 4, wherein, in step 3, the determination value of $\tilde{\phi}_i$ (i=0, 1, 2, 3) is denoted as $\hat{\phi}_i$ (i=1, 2, 3) and has a value set of (0, π/2, π, 3π/2); the value $\hat{\phi}_i$ (i=1,2,3) is determined by finding a value from the set (0, π/2, π, 3π/2) that is closest to the phase $\tilde{\phi}_i$ (i = 0,1,2,3).

6. The signal demodulation method according to claim 4, wherein, in step 3, the most unreliable phase is the phase corresponding to the complex number having its real part closest to its imaginary part in absolute value among complex numbers $\exp(j*\tilde{\varphi}_1)$, $\exp(j*\tilde{\varphi}_2)$, $\exp(j*\tilde{\varphi}_3)$.

7. The signal demodulation method according to claim 1, wherein, in step 5, the incoming 8 bits are obtained by looking up in tables based on the determined phases.

* * * * *